US012363380B1

(12) United States Patent
Abdool et al.

(10) Patent No.: US 12,363,380 B1
(45) Date of Patent: Jul. 15, 2025

(54) SYSTEMS AND METHODS FOR TRACKING DEVICE ENGAGEMENT

(71) Applicant: Amazon Technologies, Inc., Seattle, WA (US)

(72) Inventors: Ali Abdool, Los Angeles, CA (US); Wenbin Ouyang, Redmond, VA (US); Hengameh Mirzaalian Dastjerdi, Culver City, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/342,606

(22) Filed: Jun. 27, 2023

(51) Int. Cl.
*H04N 21/442* (2011.01)
*H04N 21/41* (2011.01)
*H04N 21/4223* (2011.01)
*H04N 21/436* (2011.01)
*H04N 21/466* (2011.01)

(52) U.S. Cl.
CPC ... *H04N 21/44218* (2013.01); *H04N 21/4122* (2013.01); *H04N 21/4223* (2013.01); *H04N 21/43615* (2013.01); *H04N 21/4667* (2013.01)

(58) Field of Classification Search
CPC ......... H04N 21/44218; H04N 21/4122; H04N 21/4223; H04N 21/43615; H04N 21/4667
See application file for complete search history.

(56) References Cited

U.S. PATENT DOCUMENTS

| 9,740,278 | B2* | 8/2017 | Baldwin | G06F 3/013 |
| 2014/0259034 | A1* | 9/2014 | Terrazas | H04N 21/41265 725/12 |
| 2014/0313120 | A1* | 10/2014 | Kamhi | G06F 1/3265 345/102 |
| 2021/0392401 | A1* | 12/2021 | Suresh | H04N 21/42203 |
| 2024/0118746 | A1* | 4/2024 | Yerkes | G06F 9/453 |

* cited by examiner

*Primary Examiner* — Junior O Mendoza
(74) *Attorney, Agent, or Firm* — Eversheds Sutherland (US) LLP

(57) ABSTRACT

Provided are systems and methods for tracking device engagement The system includes a viewing device (e.g., television, etc.) and an eye-tracking device (e.g., a camera, etc.). The eye-tracking device is configured to capture data about the gaze of a viewer to determine if the viewer is watching the television at any given point in time. This information may be used for a variety of purposes, such as tracking user engagement with advertisement content. As another example, the information may be used for device energy saving purposes. For example, a screen of the device can be dimmed or turned off if the gaze of the viewer has not been directed towards the television for a given period of time. A notification may also be presented to the viewer prompting the viewer to indicate if they are still viewing the content being presented on the device.

14 Claims, 7 Drawing Sheets

SYSTEMS AND METHODS FOR TRACKING DEVICE ENGAGEMENT

BACKGROUND

Currently, it is difficult to determine if a viewer is actually watching the content that is being presented on a device (e.g., a television, smartphone, computer, tablet, etc.) or if the viewer has shifted their attention away from the device. Consequentially, it may be difficult for advertisers to determine if the advertisement content that is being presented on the devices is actually being viewed by the viewers. This may be impactful in other manners as well. For example, the device may continue to use energy even when not in use by the viewer, resulting in inefficient energy usage.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element, depending on the context, may encompass a plural number of such components or elements and vice versa.

DETAILED DESCRIPTION

Figure 1:
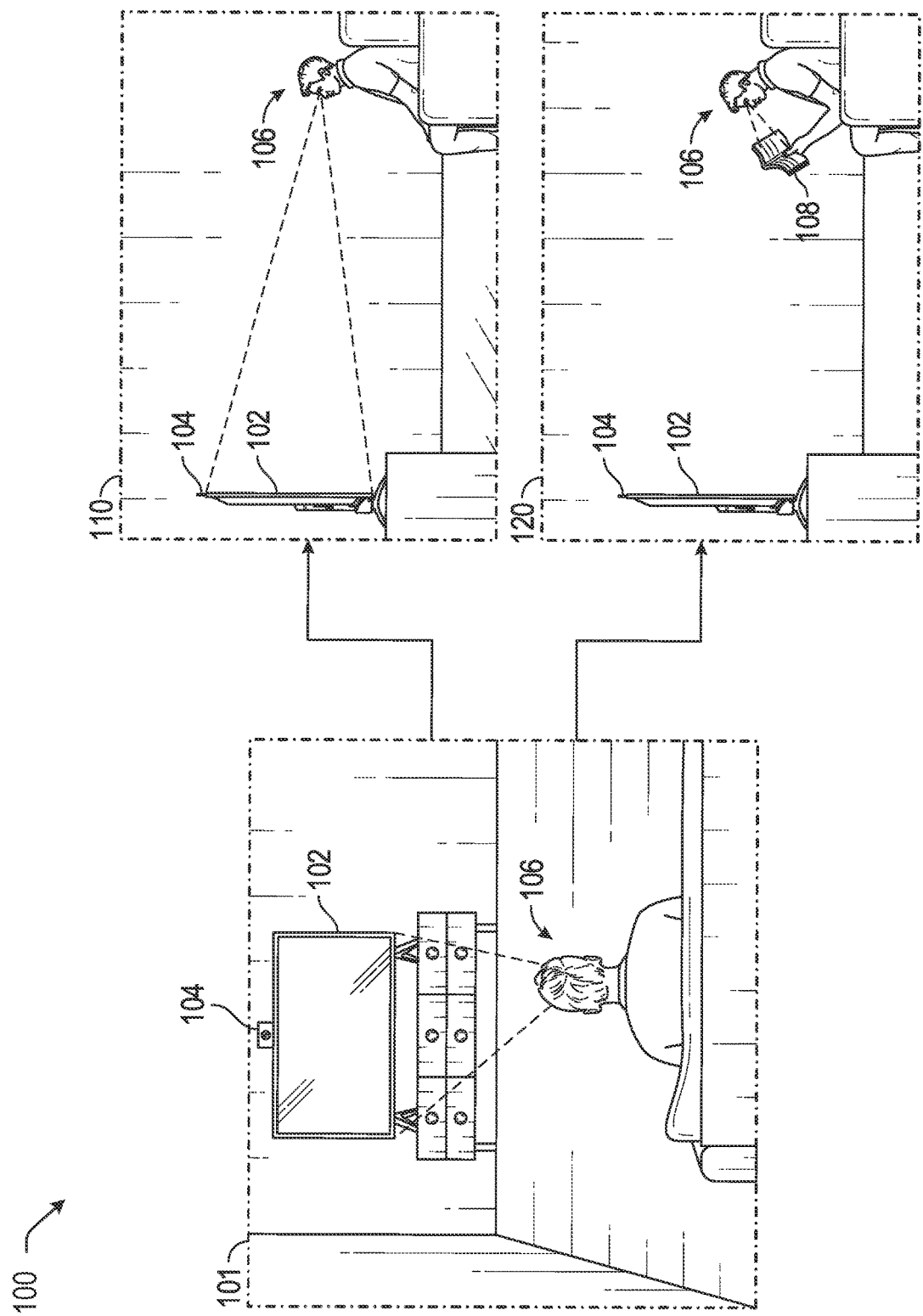
FIGS. 1-4 are example use cases for tracking device engagement in accordance with one or more example embodiments of the disclosure.

This disclosure relates to, among other things, systems and methods for tracking device engagement. Particularly, the system uses a combination of eye tracking and machine learning (ML) to identify if viewers (the term "user" may be used interchangeably with "viewer" herein) are actually watching the content being presented on a viewing device (such as a television, laptop or desktop computer, tablet, etc.). The system includes a separate eye-tracking device that can be provided on or near the viewing device on which the content is being presented. The eye-tracking device may track the movement of the viewer's eyes in real-time. That is, the eye-tracking device may track the gaze of the user to determine the points in time at which the user is viewing the viewing device and the points in time at which the user is no longer viewing the viewing device.

In embodiments, the eye-tracking device may be a camera (for example, an RGB camera, infrared (IR) camera, and/or any other type of camera. Accordingly, the eye-tracking device may capture image data ("image data" as used herein may refer to images and/or video captured by the camera) of an environment in which the viewing device is present. For example, a viewer may be watching content being presented on a television in a family room of a residential home. A camera provided on or near the television may capture the eye movements of the viewer and may send the resulting data to a system including an ML model. The ML model may then analyze the data to determine if the viewer is looking directly at the viewing device or if the gaze of the viewer is focused elsewhere.

Given that the eye-tracking device may be a camera that captures image data, the eye-tracking device may also capture other types of information about the viewer. For example, the eye-tracking device may capture a head pose of the viewer, an indication of whether the viewer is still present within the environment in which the viewing device is provided (e.g., if the viewer has left the room), and/or any other types of relevant information that may be used to determine if the viewer is still viewing content being presented on the viewing device. Use cases showing example environments including viewing devices and eye-tracking devices are shown in FIGS. 1-4.

The model may use various features of the eye-tracking data, such as the position, movement, and duration of the viewer's gaze, to identify patterns that indicate whether the viewer is engaged with the viewing device (for example, whether the viewer is watching the content being presented).

In embodiments, a supervised learning ML architecture may be used. This type of architecture may be beneficial because the system may be trained using a large dataset of eye-tracking data, which can be labeled as either the gaze of the viewer being directed toward the viewing device or diverted away from the viewing device. In some instances, a binary classification model may be used to determine if the viewer is viewing the viewing device or not viewing the viewing device. Specifically, a deep neural network (DNN) architecture could be used, as DNNs have been shown to perform well on image-based classification tasks and can handle large amounts of data. Some possible DNN models that could be used are convolutional neural networks (CNNs), which are commonly used for image recognition tasks, or recurrent neural networks (RNNs), which are useful for processing sequences of data, such as eye-tracking data over time.

While reference is made to specific types of ML models, any other type of ML model similarly may be employed. Additionally, while reference is made herein to the use of a machine learning model, this is not intended to be limiting, and any other type of artificial intelligence and the like may be used. Reference may be made herein to a "computing model," which may refer to any type of artificial intelligence, machine learning, etc.

The ML model may also be trained using historical data to improve its accuracy in identifying when viewers are engaged with the viewing device. Additionally, even after being initially trained using historical data, the ML model may continue to be trained in real-time based on eye-tracking data received from the eye-tracking device while the eye-tracking device is in operation. In this manner, the accuracy of the ML model may continue to be improved in real-time even after the eye-tracking device is provided in an environment for use.

The eye gaze data that is captured by the eye-tracking device may be used for a number of different purposes. As a first example, the data may be used by advertisement publishers (e.g., entities that generate advertisement content that may be presented to the viewer through the viewing device) to capture more accurate metrics relating to viewership of any advertisements that are presented. For example, without the use of the data captured by the eye-tracking device, the advertisement publishers may rely on an indication of whether a viewing device is presenting an advertisement to determine if a particular viewer, household, etc. is viewing the advertisement. However, in some instances, the advertisement may be presented on the viewing device, but the viewer may not be actively engaged with the viewing device and thus may not actually be viewing the advertisement. However, the data captured by the eye-tracking device may provide a more accurate indication of whether the viewer is actually viewing the advertisement that is being presented.

As a second example, the eye gaze data may be used for device energy conversation purposes. For example, if it is determined that the eye gaze of the user has been directed away from the viewing device for a threshold amount of time, then the screen brightness of the viewing device may be dimmed to conserve energy. When the viewer directs their gaze back toward the viewing device, the screen brightness may again be increased. Similarly, the viewing device itself may be turned off if the gaze of the viewer has been directed away from the viewing device for a threshold period of time. The threshold periods of time for dimming the screen and turning off the viewing device, in some cases, may be two different threshold periods of time. For example, a shorter threshold period of time may be used to determine when to dim the screen and a longer threshold period of time may be used to determine when to turn off the viewing device.

In embodiments, the actions taken by the viewing device to conserve energy may also be based on data other than the gaze of the viewer. For example, the eye-tracking device may also provide an indication of the head pose of the viewer or whether the viewer is still present within the environment of the viewing device (e.g., whether the viewer has left the room in which the viewing device exists). These are merely two example use cases of the eye gaze data, and such data may also be used for any number of other purposes as well.

The system may also be configured to generate alerts or notifications when it is determined that the viewer's attention has shifted away from the viewing device. For example, a notification may be presented on the viewing device prompting the viewer to indicate whether they are still viewing the content being presented on the viewing device. For example, if the viewing device is a television, the notification may be presented on the television. In other embodiments, the notification may be presented on the smartphone. For example, the tracking device may determine that the gaze of the user is directed toward the smartphone, so the notification may be presented on the smartphone such that the user is more likely to view the notification. The notification may also be presented on any other combination of different types of devices.

If the user indicates that they are still viewing the content (for example, through any of the devices that present the notification), then the television may continue to present the content. However, if the user fails to indicate within a threshold period of time that they are still viewing the content, then the television may cease presenting the content. The television may also perform other actions to conserve energy, such as dimming the brightness of the screen or turning off the television entirely.

In embodiments, the television may perform actions to conserve energy even before the notification is present and/or after the notification is presented but before the threshold amount of time has been reached. For example, the television may dim the brightness of the screen, but the television may remain on until the threshold period of time has elapsed. Once the threshold period of time has elapsed, the television may then turn off.

In embodiments, the eye-tracking device may also be configured to capture data about multiple users present in the environment in which the viewing device is provided. For example, if there are three viewers present in a room with a television, the eye-tracking device may capture data indicating the number of users present in the environment (e.g., the three users). The eye-tracking device may also capture image data of the three users and the image data may be analyzed by the system to determine the direction of the gaze of each of the viewers at any given time.

In further embodiments, multiple eye-tracking devices may be provided if multiple viewing devices are present in an environment. For example, a residential home may have multiple televisions. A first television may be included in a living room and a second television may be included in a bedroom. The first television and the second television may each include associated eye-tracking devices. In an example scenario, the first television is presenting content to the viewer, and the viewer leaves the living room and walks into the bedroom. The eye-tracking device in the bedroom may capture data indicating that the viewer is currently present in the bedroom. Based on this determination, a notification may be presented to the viewer (for example, through the second television or another device) prompting the user to indicate if they desire for the content being presented on the first television to instead be presented on the second television. If the viewer provides an indication that they desire for the content to be presented on the second television, then the second television may be turned on and the second television may begin to present the content.

While reference is made herein to use cases involving tracking advertisement metrics and performing energy conservation actions, the eye gaze data that is captured may also be used for any other purposes.

Turning to the figures, FIGS. 1-4 are example use cases for tracking device engagement. Beginning with FIG. 1, a use case 100 is shown illustrating the tracking of viewer engagement with a viewing device (for example, television 102). In a first scene 101 of the use case 100, the viewer 106 is illustrated as sitting on a couch watching content being presented on the television 102. The scene 101 also illustrates that a separate eye-tracking device 104 is provided on the television 102. For example, the eye-tracking device 104 is shown as being a camera (for example, an RGB camera, infrared (IR) camera, and/or any other type of camera). However, this is not intended to be limiting, and the eye-tracking device (or any other eye-tracking device described herein) similarly may be any other type of device that may be used to capture eye gaze data.

Although the eye-tracking device 104 is shown as being provided on top of the television 102, the eye-tracking device 104 similarly may be provided at any other location on the television 102. The eye-tracking device 104 may also be provided proximate to the television 102, rather than being provided directly on the television 102. In some instances, the eye-tracking device 104 may be integrated into the television 102 such that the eye-tracking device 104 and television 102 form on single device (e.g., the television 102 has eye-tracking capabilities built in, such as an integrated camera).

Scenes 110 and 120 of the use case 100 illustrate the eye-tracking functionality of the eye-tracking device 104. Scenes 110 and 120 show a side view of the same environment shown in scene 101. Scene 110 illustrates a point in time at which the viewer 106 is engaged with the television 102 and is viewing the content being presented on the television 102. For example, the scene 110 shows that the gaze of the user is directed toward the television 102. The eye-tracking device 104 captures information relating to the gaze of the viewer 106 and determines that the viewer 106 is viewing the content being presented on the television 102.

In embodiments, the determination whether the gaze of the viewer 106 is directed toward the television 102 or away from the television 102 may be made using a machine learning model. The model may use various features of the eye-tracking data, such as the position, movement, and duration of the viewer's gaze, to identify patterns that indicate whether the viewer is engaged with the viewing device (for example, whether the viewer is watching the content being presented).

The machine learning model may be included within the television 102, the eye-tracking device 104, and/or at a remote system, such as a remote server, for example. That is, in embodiments, the eye-tracking device 104 may transmit any captured data to a remote system for processing. The remote system may also provide any instructions back to the eye-tracking device 104 and/or the television 102 based on the results of the processing.

Likewise, scene 120 illustrates a point in time at which the viewer 106 is not engaged with the television 102 and is not viewing the content being presented on the television 102. For example, the scene 120 shows that the gaze of the viewer 106 is directed toward a book 108 rather than being directed toward the television 102. The eye-tracking device 104 again captures information relating to the gaze of the viewer 106 and determines that the viewer 106 is no longer viewing the content being presented on the television 102 because the gaze of the viewer 106 is no longer directed toward the television 102.

Figure 2:
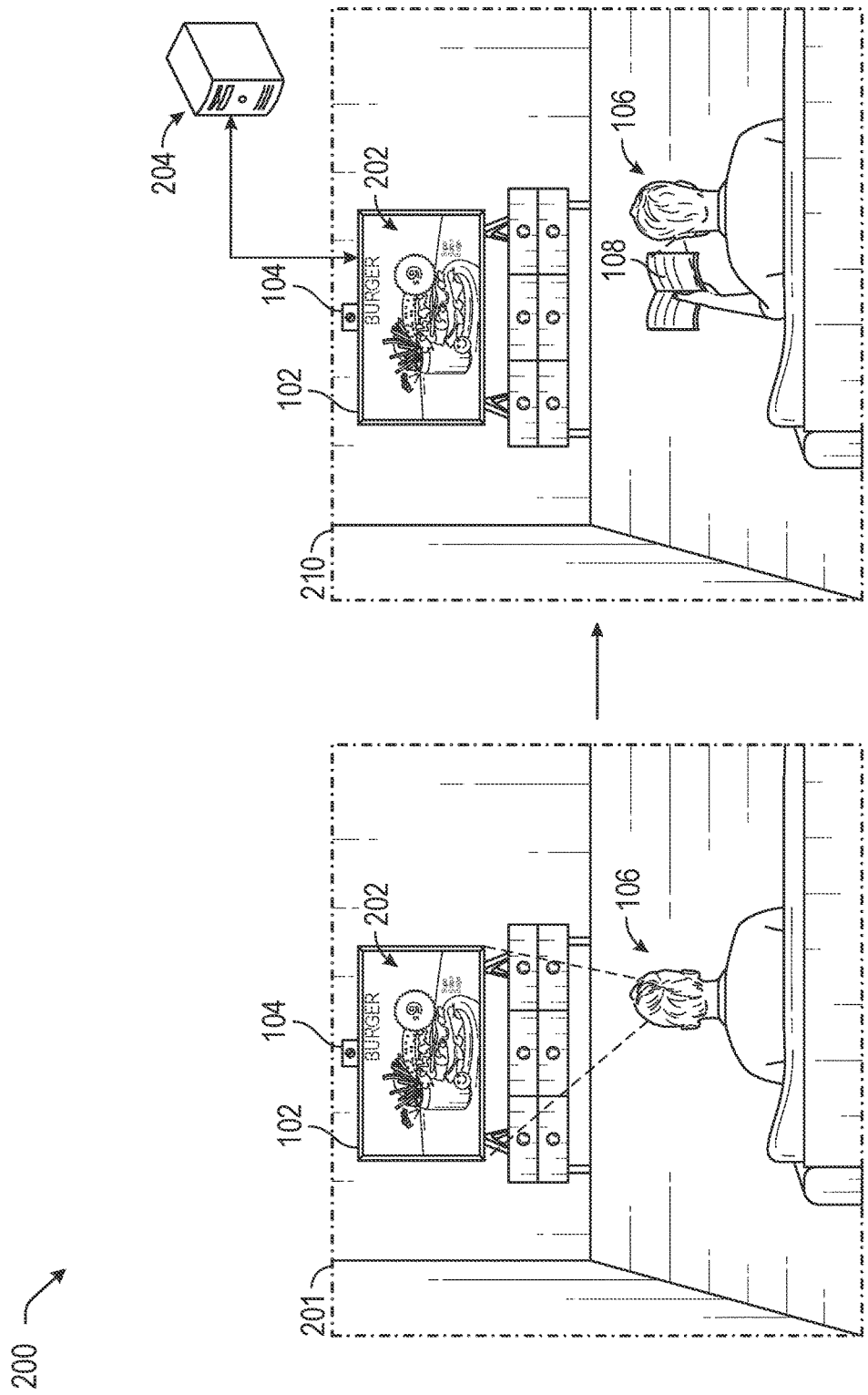

FIG. 2 shows another use case 200 in which the eye-tracking functionality illustrated in the use case 100 is applied to determine advertisement viewership data. Similar to scene 101, scene 201 of the use case 200 shows a viewer 106 sitting on a couch watching content being presented on the television 102. In the use case 200, the content is an advertisement 202. The scene 201 also illustrates that the eye-tracking device 104 is provided on the television 102. The eye-tracking device 104 tracks the gaze of the viewer 106 and determines that the gaze of the viewer 106 is directed toward the television 102. Based on this, the device 104 determines that the viewer 106 is viewing the advertisement 202 being presented on the television 102. In embodiments, the device 106 may not necessarily make this determination but may instead capture the gaze data for the viewer 106 and transmit the data to a remote device or system (such as a remote server, for example) for processing.

Scene 210 illustrates a point in time at which the viewer 106 is not engaged with the television 102 and is not viewing the advertisement 202 being presented on the television 102. For example, similar to scene 120 of use case 100, scene 210 shows that the gaze of the viewer 106 is directed toward a book 108 rather than being directed toward the television 102. The eye-tracking device 104 again captures information relating to the gaze of the viewer 106 and determines that the viewer 106 is no longer viewing the advertisement 202 being presented on the television 102 because the gaze of the viewer 106 is no longer directed toward the television 102.

In embodiments, this data may be transmitted to an advertiser system 204. In this manner, data about actual user engagement with the advertisement 202 being presented may be ascertained by the advertisement publisher that produced the advertisement 202. Without the data from the eye-tracking device 104, the advertisement publisher may inaccurately determine that the viewer 106 is viewing the full advertisement 202 based on an indication that the advertisement 202 is being presented on the television 202. However, as shown in the scene 210, the viewer 106 may not necessarily be viewing the advertisement 202 for the full length of advertisement 202 even if the advertisement 202 is being presented on the television 102.

The use of the eye-tracking device 104 thus provides more accurate advertisement viewership data to the advertisement publisher. In embodiments, the advertisement system 204 may determine that the viewer 106 viewed the advertisement 202 by determining an amount of time that the gaze of the viewer 106 was directed toward the television 102 while the advertisement 202 was being presented on the television 102. If this amount of time satisfies a threshold amount of time (for example, is equal to or greater than the threshold amount of time), then the advertisement system 204 may determine that the advertisement 202 was viewed by the viewer 106. In embodiments, the threshold amount of time may represent a percentage of the time that the advertisement 202 was presented (e.g., 75% of the advertisement 202, 90% of the advertisement 202, etc.).

Figure 3:
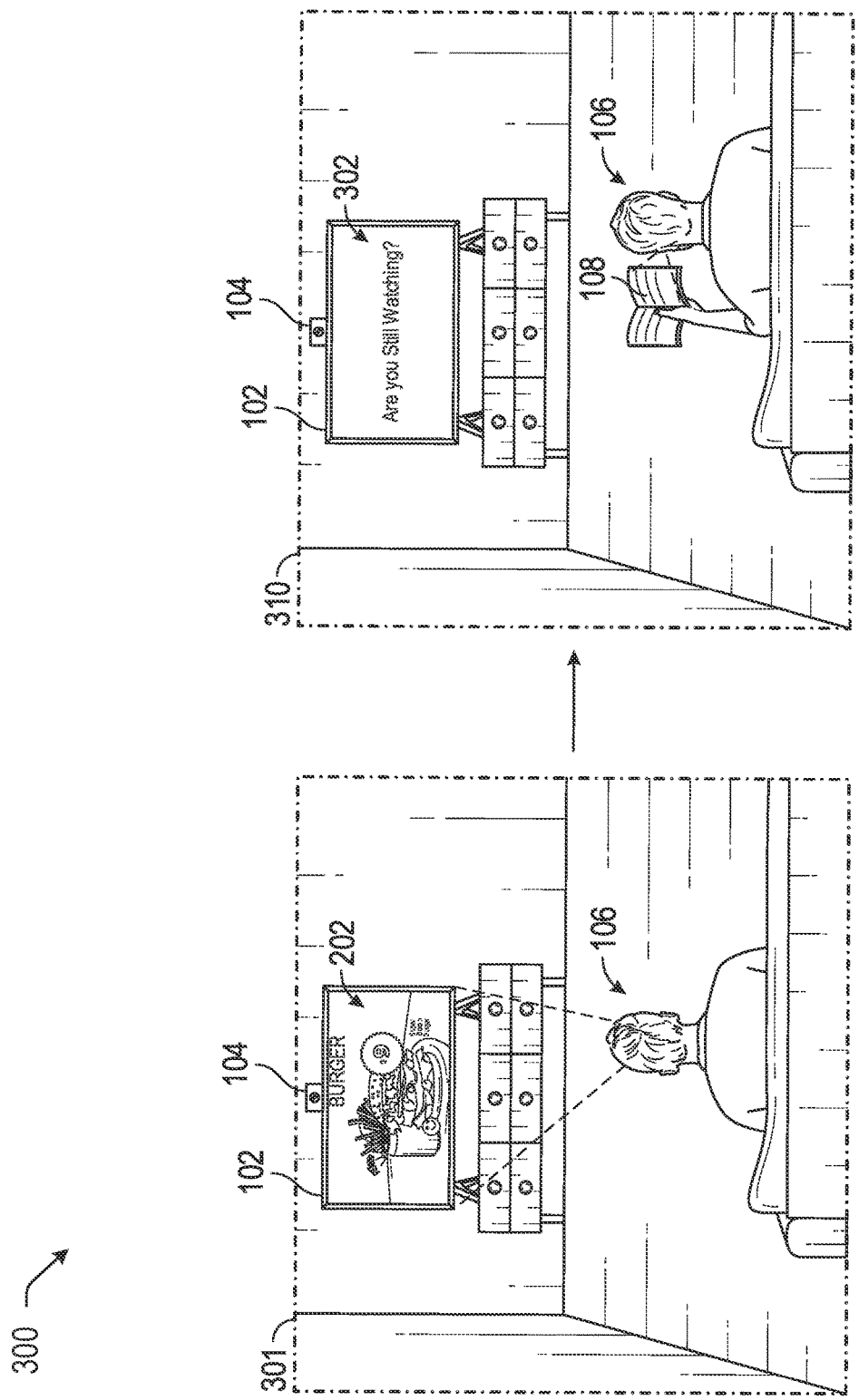

FIG. 3 shows another use case 300 in which notifications are presented to a viewer 106 when it is determined that the viewer 106 has not viewed the television 102 for a threshold period of time. That is, the use case 300 illustrates another use of the eye-tracking device 104 in providing energy savings when the television 102 is not being viewed by the viewer 106.

Scene 301 shows a point in time at which the viewer 106 is engaged with the television 102. Scene 310 shows a point in time at which the viewer 106 is not engaged with the television 102 and is not viewing the advertisement 202 being presented on the television 102. For example, similar to scene 120 of use case 100, scene 210 shows that the gaze of the viewer 106 is directed toward a book 108 rather than being directed toward the television 102.

Based on a determination that the gaze of the viewer 106 has been directed away from the television 102 for a threshold period of time, the television 102 presents a notification 302 to the viewer 106. The notification 302, for example, may be a prompt requesting the viewer 106 to indicate if they are still viewing the content being presented on the television 102. In embodiments, the notification 302 may be presented on the television 102. In other embodiments, the notification 302 may be presented on the book 108. For example, the tracking device 104 may determine that the gaze of the viewer 106 is directed toward the book 108, so the notification 302 may be presented on the book 108 such that the viewer 106 is more likely to view the notification. The notification 302 may also be presented on any other combination of different types of devices.

If the viewer 106 indicates that they are still viewing the content (for example, through any of the devices that present the notification), then the television 102 may continue to present the content. However, if the viewer 106 fails to indicate within a threshold period of time that they are still viewing the content, then the television 102 may cease presenting the content. The television 102 may also perform other actions to conserve energy, such as dimming the brightness of the screen or turning off the television 102 entirely.

In embodiments, the television 102 may perform actions to conserve energy even before the notification is present and/or after the notification is presented but before the threshold amount of time has been reached. For example, the television 102 may dim the brightness of the screen, but the television 102 may remain on until the threshold period of time has elapsed. Once the threshold period of time has elapsed, the television 102 may then turn off.

In embodiments, the gaze of the viewer 106 may similarly be used to turn the television 102 back on as well. For example, if the television 102 is turned off to conserve energy based on the gaze of the viewer 106 being directed away from the television 102, the gaze of the viewer 106 being re-directed toward the television 102 may also cause the television 102 to again turn back on. This may also be applicable even if the television 102 was not automatically turned off for energy conservation purposes as described herein. For example, if the viewer 106 walks into a room and wishes to begin watching content on the television 102, the viewer 106 may gaze toward the television 102. If the data captured by the eye-tracking device 104 indicates that the gaze of the viewer 106 has been directed toward the television 102 for a threshold period of time, then the television 102 may automatically turn on. In this manner, the television 102 may be turned on by the viewer 106 based on gaze alone. Similar operations may be applicable to increasing or decreasing the brightness of the screen of the television 102 and/or any other features of the television 102.

Figure 4:
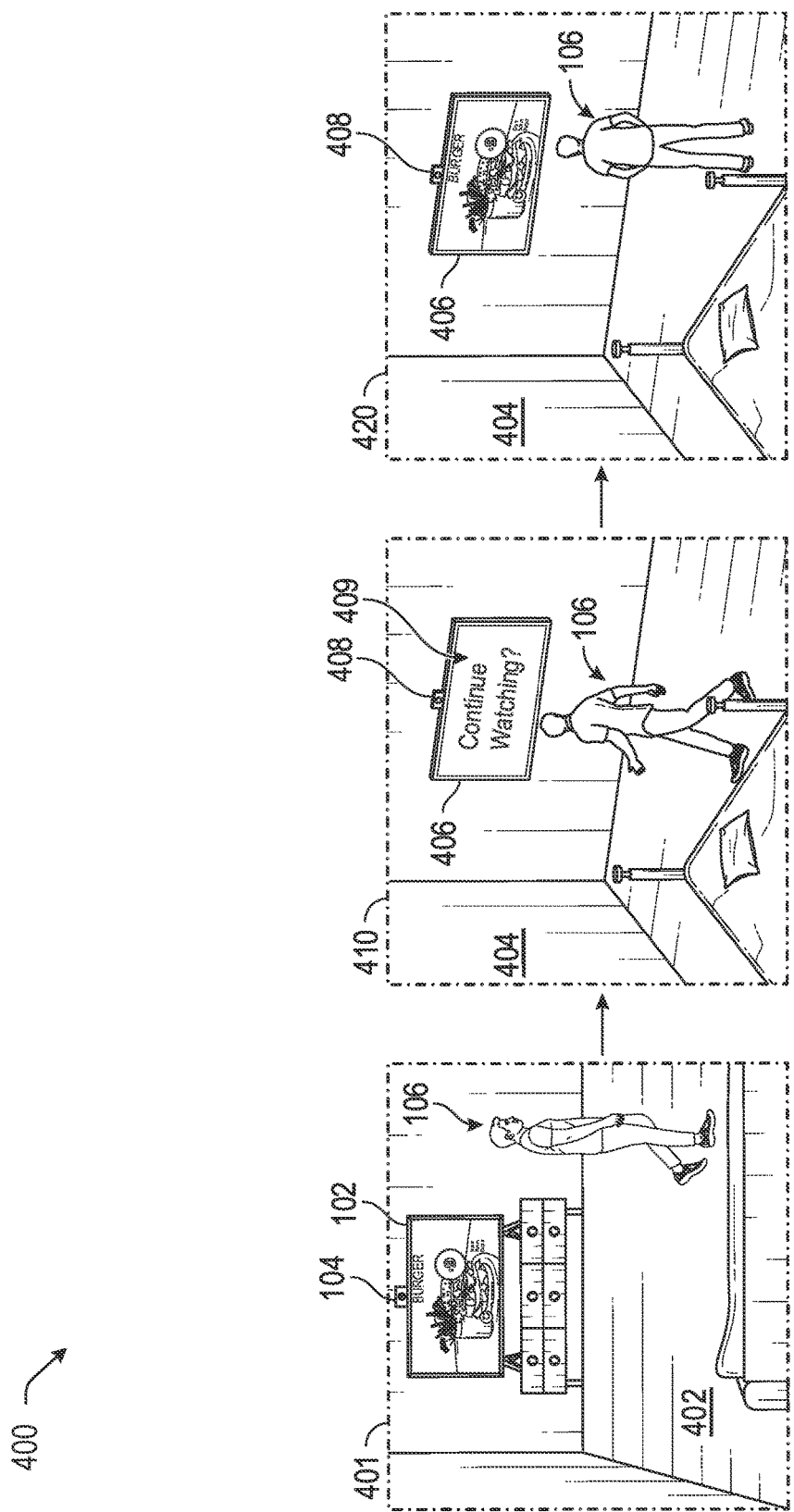

FIG. 4 shows yet another use case 400 in which multiple eye-tracking devices are provided for multiple viewing devices. For example, a first scene 401 (similar to use cases 100-300) shows viewer 106 within a first environment 402 (for example, a family room) including a television 102 and an associated eye-tracking device 104. In the first scene 401, the television 102 is illustrated as presenting content to the viewer 106. The viewer 106 is shown as walking out of the first environment 402 (for example, leaving the family room).

The second scene 410 shows the viewer 106 entering a second environment 404 (for example, a bedroom). The second environment 404 includes a second viewing device (for example, a television 406) and an associated second eye-tracking device 408. As the viewer 106 enters the second environment 404 data captured by the second eye-tracking device 408 is used to determine that the viewer 106 is now in the second environment 404 with the television 406. Additionally, data captured by the eye-tracking device 104 in the first environment 402 may indicate that the viewer is no longer present in the first environment 402.

Based on the determination that the viewer 106 is in the second environment 404 with the television 406 instead of the first environment 402 with the television 102, the television 406 may present a notification 409 to the viewer 106. The notification 409 may be a prompt requesting for the viewer 106 to indicate if they desire for the content currently being presented on the television 102 to instead be presented on the television 406 now that the viewer is in the second environment 404. The viewer 106 may provide a response to the prompt using any mechanism described herein or otherwise. For example, the viewer 106 may press a button on a remote control device or on the television 406. As another example, the viewer 106 may also provide an auditory response to the prompt. As yet another example, the viewer 106 may also provide an input to a smartphone application.

The third scene 420 shows that the content is now being presented to the viewer 106 on the television 406 in the second environment 404. In embodiments, the screen of the television 102 may also cease to present the content, and the screen may also be dimmed and/or turned off such that the content is only being presented on the television 406. However, in some instances, it may still be desirable to maintain presentation of the content on the television 102 as well (for example, if a second viewer is still present within the environment 402, which may be determined using data captured by the eye-tracking device 104).

Figure 5:
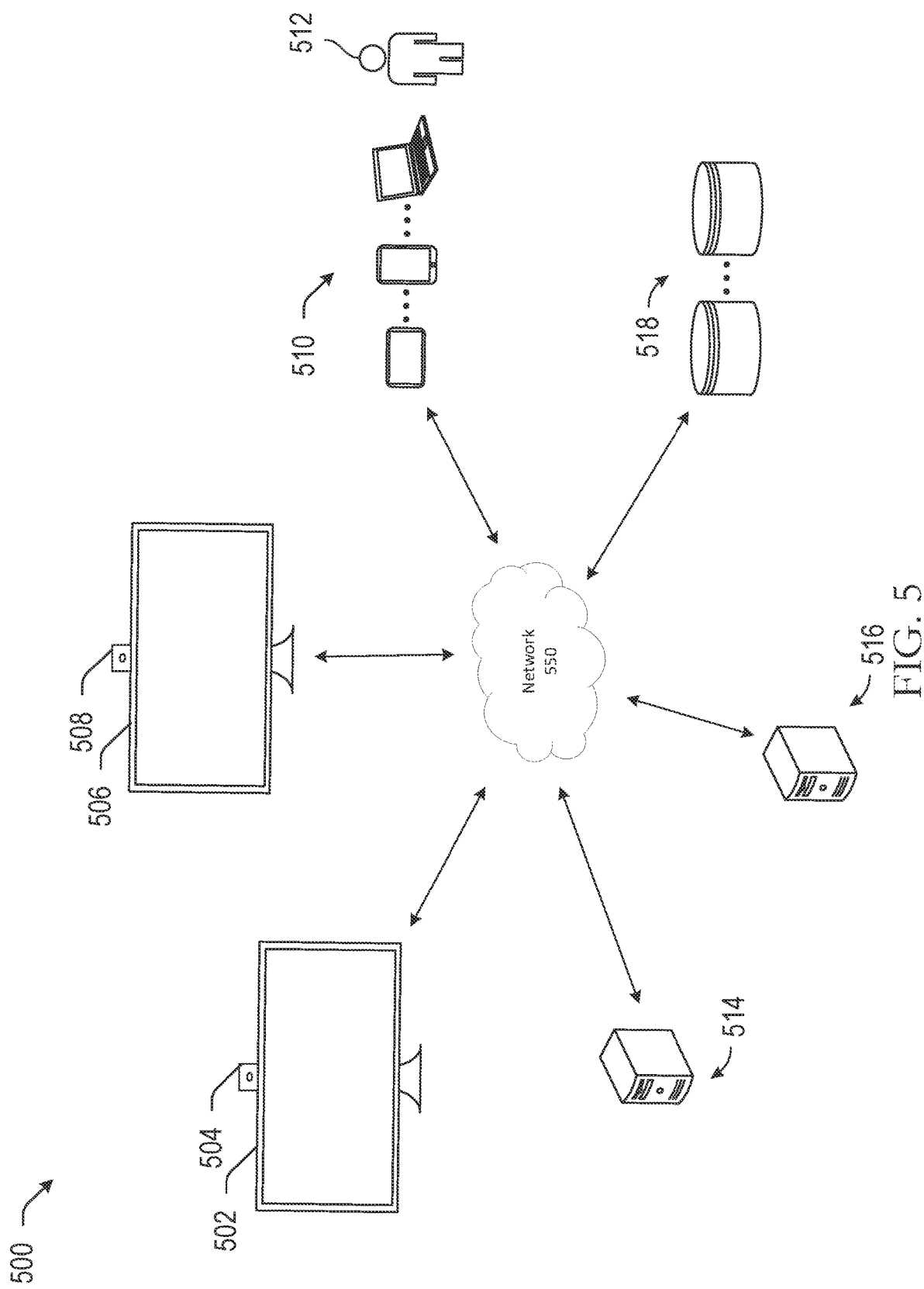
FIG. 5 is an example system for tracking device engagement in accordance with one or more example embodiments of the disclosure.

FIG. 5 is an example system 500 for tracking device engagement. In one or more embodiments, the system 500 may include one or more viewing devices (such as a first viewing device 502 and a second viewing device 506, as well as any other number of viewing devices), one or more eye-tracking devices (such as first eye-tracking device 504, second eye-tracking device 508, as well as any other number of eye-tracking devices), one or more user devices 510 that may be associated with a user 512, a remote computing system 514, an advertiser system 516 and/or one or more databases 518. However, these components of the system 500 are merely exemplary and are not intended to be limiting in any way. For simplicity, reference may be made hereinafter to a viewing device, user device 510, etc.; however, this is not intended to be limiting and may still refer to any number of such elements.

The viewing device may include any number of different types of devices that are configured to present content that is viewable by the user 512. For example, FIG. 5 shows the first viewing device 502 and the second viewing device 506 as being televisions (FIG. 1 also shows the television 102 as an example of a viewing device). However, this is not intended to be limiting, and the viewing device may also include any type of device (other examples may include laptop or desktop computers, tablets, etc.). The system 500 depicts two distinct viewing devices to illustrate that a particular environment or environments (such as a residential home, commercial establishment, etc.) may include multiple such viewing devices.

The eye-tracking device may be provided on or near the viewing device on which the content is being presented. For example, the system 500 shows that eye-tracking device 504 is provided on viewing device 502 and that eye-tracking device 508 is provided on viewing device 506. The eye-tracking device may similarly be provided at any other location on the viewing device. The eye-tracking device may also be provided proximately to the viewing device, rather than being provided directly on the viewing device. In some instances, the eye-tracking device may be integrated into the viewing device such that the eye-tracking device and viewing device form a single device (e.g., the viewing device has eye-tracking capabilities built in, such as an integrated camera).

Another example of an eye-tracking device is shown in FIG. 1 as eye-tracking device 104. The eye-tracking device may track the gaze of the user 512 in real-time. That is, the eye-tracking device may track the gaze of the user 512 to determine the points in time at which the user 512 is viewing the viewing device and the points in time at which the user 512 is no longer viewing the viewing device.

In embodiments, the eye-tracking device may be a camera (for example, an RGB camera, infrared (IR) camera, and/or any other type of camera. Accordingly, the eye-tracking device may capture image data ("image data" as used herein may refer to images and/or video captured by the camera) of an environment in which the device is present. The eye-tracking device may capture the eye movements of the user 512 and may send the resulting data to a system including a ML model (for example, the remote computing system 514). The ML model may then analyze the eye-tracking data to determine if the user 512 is looking directly at the viewing device or if the gaze of the user 512 is focused elsewhere. In embodiments, this processing may also be performed by any other device or system within system 500 (for example, a viewing device, eye-tracking device, user device, etc.).

In embodiments, multiple eye-tracking devices may be provided within an environment. Multiple eye-tracking devices may be provided, for example, to maximize the field of view (FOV) of the image data captured by the eye-tracking devices. That is, a single eye-tracking device may have a limited FOV and may not necessarily be able to capture image data for an entire room in which a viewing device is located. Thus, additional eye-tracking devices may be provided such that image data for the entire area of the room may be captured.

The user device 510 may be any type of device, such as a smartphone, desktop computer, laptop computer, tablet, and/or any other type of device. The user device 510 may include an application that may allow the user 512 to perform certain functions, such as, responding to a notification presented by a viewing device (the notification may also be presented on the user device 510 through the application). The user device 510 may also serve as an additional eye-tracking device to provide additional data. For example, a camera of the user device 510 may also be used to track gaze data.

The remote computing system 514 (a remote server, for example) may be configured to receive the eye gaze data captured by any of the eye-tracking devices and process the data to determine whether the gaze of the user 512 is directed toward a particular viewing device or away from the viewing device at any given time.

In embodiment, the remote computing system 514 may host a ML model that may be used to make such determinations. The model may use various features of the eye-tracking data, such as the position, movement, and duration of the viewer's gaze, to identify patterns that indicate whether the viewer is engaged with the viewing device (for example, whether the viewer is watching the content being presented).

In embodiments, a supervised learning ML architecture may be used. This type of architecture may be beneficial because the system may be trained using a large dataset of eye-tracking data, which can be labeled as either the gaze of the viewer being directed toward the viewing device or diverted away from the viewing device. In some instances, a binary classification model may be used to determine if the viewer is viewing the viewing device or not viewing the viewing device. Specifically, a deep neural network (DNN) architecture could be used, as DNNs have been shown to perform well on image-based classification tasks and can handle large amounts of data. Some possible DNN models that could be used are convolutional neural networks (CNNs), which are commonly used for image recognition tasks, or recurrent neural networks (RNNs), which are useful for processing sequences of data, such as eye-tracking data over time.

While reference is made to specific types of ML models, any other type of ML model similarly may be employed. Additionally, while reference is made herein to the use of a machine learning model, this is not intended to be limiting and any other type of artificial intelligence and the like may be used. Reference may be made herein to a "computing model," which may refer to any type of artificial intelligence, machine learning, etc.

The ML model may also be trained using historical data to improve its accuracy in identifying when viewers are engaged with the viewing device. Additionally, even after being initially trained using historical data, the ML model may continue to be trained in real-time based on eye-tracking data received from the eye-tracking device while the eye-tracking device is in operation. In this manner, the accuracy of the ML model may continue to be improved in real-time even after the eye-tracking device is provided in an environment for use.

In embodiments, the remote computing system 514 may also provide instructions to the eye-tracking device, the viewing device, etc. For example, based on a determination that gaze of the user 512 has been directed away from the viewing device 502 for a threshold period of time, the remote computing system 514 may send an instruction to the viewing device 502 to dim the screen of the viewing device 502. Alternatively, the remote computing system 514 may simply send an indication of the amount of time the gaze has been directed away from the viewing device 502 and the viewing device 502 itself may determine whether to dim the screen. Dimming the screen is merely one example action, and this may also be applicable to any other action as well (e.g., turning of the viewing device 502, presenting a notification, etc.). Furthermore, all of the processing described as being performed by the remote computing system 514 may also be performed by any other device or system of the system 500 as well.

The advertiser system 516 may be associated with an advertisement publisher. In some instances, the data captured by the eye-tracking devices (or the processed data produced by the remote computing system 514) may be transmitted to an advertiser system 516. In this manner, data about actual user engagement with an advertisement being presented on a viewing device may be ascertained by the advertisement publisher that produced the advertisement. Without the data from the eye-tracking device, the advertisement publisher may inaccurately determine that the user 512 is viewing the full advertisement based on an indication that the advertisement is being presented on the viewing device. However, the user 512 may not necessarily be viewing the advertisement for the full length of advertisement even if the advertisement is being presented on the viewing device.

The use of the eye-tracking device thus provides more accurate advertisement viewership data to the advertisement publisher. In embodiments, the advertiser system 516 may determine that the user 512 viewed the advertisement by determining an amount of time that the gaze of the user 512 was directed toward the viewing device while the advertisement was being presented on the viewing device. If this amount of time satisfies a threshold amount of time (for example, is equal to or greater than the threshold amount of time), then the advertiser system 516 may determine that the advertisement was viewed by the user 512. In embodiments, the threshold amount of time may represent a percentage of the time that the advertisement was being presented (e.g., 75% of the advertisement 202, 90% of the advertisement 202, etc.).

The database 518 may store any of the data that is used as described herein. For example, the database 518 may store any data captured by the eye-tracking devices, as well as any other relevant data.

In one or more embodiments, any of the elements of the system 300 (for example, one or more viewing devices, one or more eye-tracking devices, one or more user devices 510, remote computing system 514, advertiser system 516, one or more databases 518, and/or any other element described with respect to FIG. 5 or otherwise) may be configured to communicate via a communications network 550. The communications network 550 may include, but not limited to, any one of a combination of different types of suitable communications networks, such as, for example, broadcasting networks, cable networks, public networks (e.g., the Internet), private networks, wireless networks, cellular networks, or any other suitable private and/or public networks. Further, the communications network 550 may have any suitable communication range associated therewith and may include, for example, global networks (e.g., the Internet), metropolitan area networks (MANs), wide area networks (WANs), local area networks (LANs), or personal area networks (PANs). In addition, communications network 550 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any of the elements (for example, one or more viewing devices, one or more eye-tracking devices, one or more user devices 510, remote computing system 514, advertiser system 516, one or more databases 518, and/or any other element described with respect to FIG. 5 or otherwise) of the system 500 may include any of the elements of the computing device 500 as well. For example, one or more processors 702, memory devices 704, etc.

Figure 6:
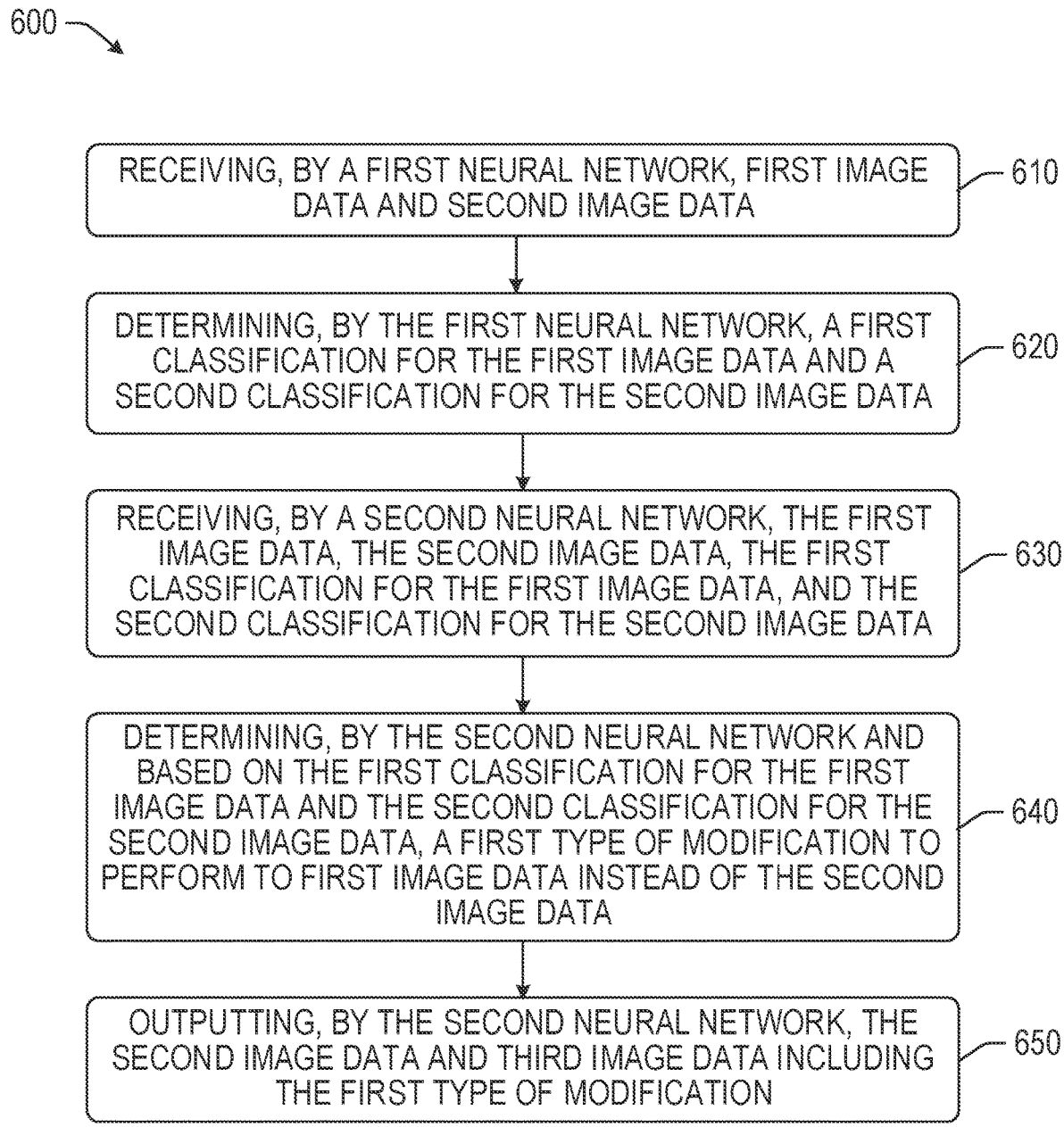
FIG. 6 is an example method for tracking device engagement in accordance with one or more example embodiments of the disclosure.

FIG. 6 depicts an example method 600 for predicting content demand. Some or all of the blocks of the process flows or methods in this disclosure may be performed in a distributed manner across any number of devices or systems (for example, one or more viewing devices, one or more eye-tracking devices, one or more user devices 510, remote computing system 514, advertiser system 516, computing device 700, etc.). The operations of the method 600 may be optional and may be performed in a different order.

At block 610 of the method 200, computer-executable instructions stored on a memory of a system or device, such as one or more viewing devices (e.g., television 102, television 406, viewing device 502, viewing device 506, etc.) one or more eye-tracking devices (e.g., eye-tracking device 104, eye-tracking device 408, eye-tracking device 504, eye-tracking device 508, etc.), one or more user devices 510, remote computing system 514, advertiser system 516, computing device 700, etc., may be executed to receive, by one or more processors and from a first device, first data indicative of a first direction of an eye gaze of a first user at a first time.

In embodiments, the eye-tracking device may be a camera (for example, an RGB camera, infrared (IR) camera, and/or any other type of camera. Accordingly, the eye-tracking device may capture image data ("image data" as used herein may refer to images and/or video captured by the camera) of an environment in which the device is present. The eye-tracking device may capture the eye movements of the viewer and may send the resulting data to a system including a ML model. The ML model may then analyze the eye-tracking data to determine if the viewer is looking directly at the viewing device or if the gaze of the viewer is focused elsewhere.

The model uses various features of the eye-tracking data, such as the position, movement, and duration of the viewer's gaze to identify patterns that indicate whether the viewer is engaged with the TV/screen or not. The system would also be trained on a large dataset of eye-tracking data to improve its accuracy in identifying when viewers are watching the TV/screen.

The type of machine learning architecture that could be used is a supervised learning architecture. This is because the system is trained on a large dataset of eye-tracking data, which can be labeled as either the viewer looking at the TV/screen or not. The ML model that could be used is a binary classification model, as the system is trying to determine if the viewer is looking at the TV/screen or not. Specifically, a deep neural network (DNN) architecture could be used, as DNNs have been shown to perform well on image-based classification tasks and can handle large amounts of data. Some possible DNN models that could be used are convolutional neural networks (CNNs), which are commonly used for image recognition tasks, or recurrent neural networks (RNNs), which are useful for processing sequences of data, such as eye-tracking data over time.

At block 620 of the method 200, computer-executable instructions stored on a memory of a system or device, such as one or more viewing devices, may be executed to determine, by the one or more processors, based on the first data, and using a computing model, that the first direction of the eye gaze of the first user is directed toward a second device at the first time.

At block 630 of the method 200, computer-executable instructions stored on a memory of a system or device, such as one or more viewing devices, may be executed to receive, by the one or more processors and from the first device, second data indicative of a second direction of an eye gaze of the first user at a second time.

At block 640 of the method 200, computer-executable instructions stored on a memory of a system or device, such as one or more viewing devices, may be executed to determine, by the one or more processors, based on the second data, and using the computing model, that the second direction of the eye gaze of the first user is directed away from the second device at the second time.

At block 650 of the method 200, computer-executable instructions stored on a memory of a system or device, such as one or more viewing devices, may be executed to determine, by the one or more processors and at a third time, that the eye gaze of the first user has been directed away from the second device for a threshold period of time.

At block 660 of the method 200, computer-executable instructions stored on a memory of a system or device, such as one or more viewing devices, may be executed to cause an action to be performed by the second device.

Figure 7:
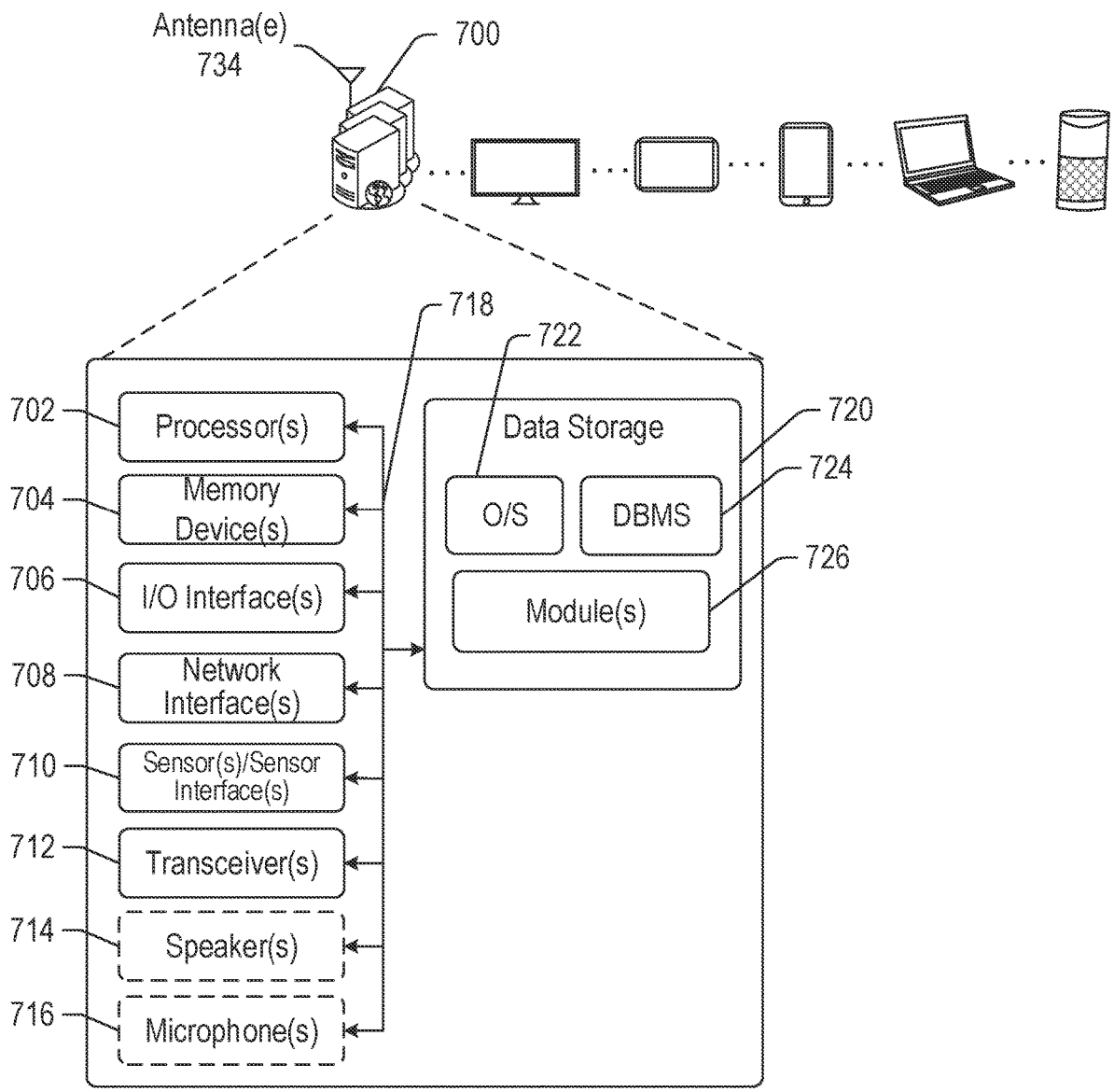
FIG. 7 is an example computing device in accordance with one or more example embodiments of the disclosure.

FIG. 7 is a schematic block diagram of an illustrative computing device 700 in accordance with one or more example embodiments of the disclosure. The computing device 700 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 700 may correspond to an illustrative device configuration for the devices of FIGS. 1-5

(for example, one or more viewing devices, one or more eye-tracking devices, one or more user devices 510, remote computing system 514, advertiser system 516, computing device 700, etc.).

The computing device 700 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks, such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 700 may include one or more processor(s) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The computing device 700 may further include one or more buses 718 that functionally couple various components of the computing device 700. The computing device 700 may further include one or more antenna(e) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the computing device 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the computing device 700 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 704 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or nonremovable storage including, but not limited to, magnetic storage, optical disk storage, and/or tape storage. The data storage 720 may provide nonvolatile storage of computer-executable instructions and other data. The memory 704 and the data storage 720, removable and/or nonremovable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704 and may ultimately be copied to data storage 720 for nonvolatile storage.

More specifically, the data storage 720 may store one or more operating systems (O/S) 722; one or more database management systems (DBMS) 724; and one or more program module(s), applications, engines, computer-executable code, scripts, or the like such as, for example, one or more module(s) 726. Some or all of these module(s) may be submodule(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the computing device 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, purchase history information, user action information, user profile information, a database linking search queries and user actions, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the computing device 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the module(s) 726 may include computer-executable instructions, code, or the like that responsive to execution by one or more of the processor(s) 702 may perform functions including, but not limited to, processing gaze data to determine if the gaze of a viewer is directed toward a viewing device, etc.

Referring now to other illustrative components depicted as being stored in the data storage 720, the O/S 722 may be loaded from the data storage 720 into the memory 704 and may provide an interface between other application software executing on the computing device 700 and hardware resources of the computing device 700. More specifically, the O/S 722 may include a set of computer-executable instructions for managing hardware resources of the computing device 700 and for providing common services to other application programs (e.g., managing memory allocation among various application programs). In certain example embodiments, the O/S 722 may control execution of the other program module(s) to dynamically enhance characters for content rendering. The O/S 722 may include any operating system now known or which may be developed in the future including, but not limited to, any server operating system, any mainframe operating system, or any other proprietary or nonproprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 700 is a mobile device, the DBMS 724 may be any suitable lightweight DBMS optimized for performance on a mobile device.

Referring now to other illustrative components of the computing device 700, the input/output (I/O) interface(s) 706 may facilitate the receipt of input information by the computing device 700 form or more I/O devices as well as the output of information from the computing device 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(e) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 700 may further include one or more network interface(s) 708 via which the computing device 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(e) 734 may include any suitable type of antenna depending, for example, on the communications protocols used to transmit or receive signals via the antenna (e) 734. Nonlimiting examples of suitable antennas may include directional antennas, nondirectional antennas, dipole antennas, folded dipole antennas, patch antennas, multiple-input multiple-output (MIMO) antennas, or the like. The antenna(e) 734 may be communicatively coupled to one or more transceivers 712 or radio components to which or from which signals may be transmitted or received.

As previously described, the antenna(e) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 734 may be configured to transmit or receive radio frequency signals within any suitable frequency range forming part of the unlicensed portion of the radio spectrum.

The antenna(e) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(e) 734—transmitting or receiving radio frequency (RF) signals in the bandwidth and/or channels corresponding to the communications protocols utilized by the computing device 700 to communicate with other devices. The transceiver(s) 712 may include hardware, software, and/or firmware for modulating, transmitting, or receiving—potentially in cooperation with any of antenna(e) 734—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the computing device 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module alternatively may be distributed across multiple module(s) or performed by a different module. In addition, various program module(s), script(s), plug-in(s), Application Programming Interface(s) (API(s)), or any other suitable computer-executable code hosted locally on the computing device 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should be appreciated that the computing device 700 may include alternate and/or additional hardware, software, or firmware components beyond those described or depicted without departing from the scope of the disclosure. More particularly, it should be appreciated that software, firmware, or hardware components depicted as forming part of the computing device 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as submodule(s) of another module, in certain embodiments, such module(s) may be provided as independent module(s) or as submodule(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner; such that, the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by one or more processors and from a camera, first image data indicative of a first direction of an eye gaze of a first user at a first time;
   determining, by the one or more processors, based on the first image data, and using a machine learning model, that the first direction of the eye gaze of the first user is directed towards a second device at the first time;
   receiving, by the one or more processors and from the camera, second image data indicative of a second direction of an eye gaze of the first user at a second time;
   determining, by the one or more processors, based on the image second data, and using the machine learning model, that the second direction of the eye gaze of the first user is directed away from the second device at the second time;
   determining, by the one or more processors and at a third time, that the eye gaze of the first user has been directed away from the second device for a threshold period of time; and
   dimming, based on determining that the eye gaze of the first user has been directed away from the second device for the threshold period of time, a screen of the second device;
   receiving, by the one or more processors, third data indicative of a third direction of an eye gaze of a first user at a third time;

determining, by the one or more processors and based on the third data, that the third direction of the eye gaze of the first user is directed towards the second device at the third time; and undimming the screen of the second device based on the determination that the eye gaze of the first user is directed towards the second device.

2. The method of claim 1, further comprising:

presenting a prompt on the second device, wherein the prompt includes a request for the first user to indicate that the first user is still viewing content being presented on the second device.

3. The method of claim 2, further comprising:

determining that a response to the prompt has not been received; and turning off the second device.

4. The method of claim 1, further comprising:

determining that the first user is no longer present within the first image data;

receiving, from a third device, second image data including the first user; and causing to present content on a fourth device instead of the second device.

5. A method comprising:

receiving, by one or more processors and from a first device, first data indicative of a first direction of an eye gaze of a first user and second data indicative of a second direction of an eye gaze of a second user at a first time;

determining, by the one or more processors, based on the first data, and using a computing model, that the first direction of the eye gaze of the first user and the second direction of the eye gaze of the second user are directed towards a second device at the first time;

receiving, by the one or more processors and from the first device, third data indicative of a third direction of an eye gaze of the first user at a second time and fourth data indicative of a fourth direction of an eye gaze of the second user at the second time;

determining, by the one or more processors, based on the third data and the fourth data, and using the computing model, that the third direction of the eye gaze of the first user and the fourth direction of the eye gaze of the second user are directed away from the second device at the second time;

determining, by the one or more processors and at a third time, that the eye gaze of the first user and the eye gaze of the second user have been directed away from the second device for a threshold period of time; and causing, based on determining that the eye gaze of the first user and the eye gaze of the second user have been directed away from the second device for the threshold period of time, an action to be performed by the second device, the action comprising dimming a screen of the second device or turning off the second device.

6. The method of claim 5, further comprising:

receiving, by the one or more processors, fifth data indicative of a fifth direction of an eye gaze of a first user at a third time;

determining, by the one or more processors, based on the fifth data, and using the computing model, that the fifth direction of the eye gaze of the first user is directed towards the second device at the third time; and turning on the second device based on the determination that the eye gaze of the first user is directed towards the second device.

7. The method of claim 5, wherein the action includes presenting a prompt on the second device, wherein the prompt includes a request for the first user to indicate that the first user is still viewing content being presented on the second device.

8. The method of claim 5, wherein the first device is a camera configured to capture first image data indicative of the eye gaze of the first user.

9. The method of claim 8, further comprising:

determining that the first user is no longer present within the first image data;

receiving, from a third device, second image data including the first user; and causing to present content on a fourth device instead of the second device.

10. A system comprising:

memory that stores computer-executable instructions; and one or more processors configured to access the memory and execute the computer-executable instructions to:

receiver, from a first device, first data indicative of a first direction of an eye gaze of a first user at a first time;

determine, based on the first data and using a computing model, that the first direction of the eye gaze of the first user is directed towards a second device at the first time;

receive, from the first device, second data indicative of a second direction of an eye gaze of the first user at a second time;

determine, based on the second data and using the computing model, that the second direction of the eye gaze of the first user is directed away from the second device at the second time;

determine, at a third time, that the eye gaze of the first user has been directed away from the second device for a threshold period of time; and cause, based on determining that the eye gaze of the first user has been directed away from the second device for the threshold period of time, an action to be performed by the second device, the action comprising dimming a screen of the second device or turning off the second device;

receive third data indicative of a third direction of an eye gaze of a first user at a third time;

determine based on the third data and using the computing model, that the third direction of the eye gaze of the first user is directed towards the second device at the third time; and turn on the second device based on the determination that the eye gaze of the first user is directed towards the second device.

11. The system of claim 10, wherein the action includes presenting a prompt on the second device, wherein the prompt includes a request for the first user to indicate that the first user is still viewing content being presented on the second device.

12. The system of claim 10, wherein the one or more processors are further configured to execute the computer-executable instructions to:

receive, from the first device, third data indicative of a direction of an eye gaze of a second user at a second time; and determine, based on the third data and using the computing model, that the direction of the eye gaze of the second user is directed towards the second device at the second time.

13. The system of claim 10, wherein the first device is a camera configured to capture first image data indicative of the eye gaze of the first user.

14. The system of claim 13, wherein the one or more processors are further configured to execute the computer-executable instructions to:
   determine that the first user is no longer present within the first image data;
   receive, from a third device, second image data including the first user; and
   cause to present content on a fourth device instead of the second device.

* * * * *